US011938917B2

(12) United States Patent
Asano et al.

(10) Patent No.: US 11,938,917 B2
(45) Date of Patent: Mar. 26, 2024

(54) BRAKING CONTROL DEVICE FOR VEHICLE

(71) Applicant: ADVICS CO., LTD., Kariya (JP)

(72) Inventors: Tomotaka Asano, Kariya (JP);
Takayuki Yamamoto, Kariya (JP);
Yasuhito Ishida, Kariya (JP)

(73) Assignee: ADVICS CO., LTD., Kariya (JP)

( * ) Notice: Subject to any disclaimer, the term of this patent is extended or adjusted under 35 U.S.C. 154(b) by 813 days.

(21) Appl. No.: 17/041,486

(22) PCT Filed: Mar. 28, 2019

(86) PCT No.: PCT/JP2019/013786
§ 371 (c)(1),
(2) Date: Sep. 25, 2020

(87) PCT Pub. No.: WO2019/189658
PCT Pub. Date: Oct. 3, 2019

(65) Prior Publication Data
US 2021/0129815 A1 May 6, 2021

(30) Foreign Application Priority Data

Mar. 30, 2018 (JP) ................................ 2018-069141

(51) Int. Cl.
G06F 7/70 (2006.01)
B60T 8/172 (2006.01)
(Continued)

(52) U.S. Cl.
CPC .............. B60T 8/96 (2013.01); B60T 8/172 (2013.01); B60T 8/321 (2013.01); B60T 8/885 (2013.01);
(Continued)

(58) Field of Classification Search
CPC . B60T 8/96; B60T 8/172; B60T 8/321; B60T 8/885; B60T 17/221;
(Continued)

(56) References Cited

U.S. PATENT DOCUMENTS 9,073,540 B2 * 7/2015 Cauthen .............. B60W 10/196
2004/0164612 A1 * 8/2004 Worrel ................ B60L 15/2009
303/177
2015/0321655 A1 * 11/2015 Kim ........................ B60T 8/885
701/70

FOREIGN PATENT DOCUMENTS

JP 2000-249577 A 9/2000
JP 2010167970 A 8/2010

OTHER PUBLICATIONS

International Search Report (PCT/ISA/210) dated Jun. 25, 2019, by the Japan Patent Office as the International Searching Authority for International Application No. PCT/JP2019/013786.
(Continued)

Primary Examiner — Shardul D Patel
(74) Attorney, Agent, or Firm — BUCHANAN INGERSOLL & ROONEY PC

(57) ABSTRACT

A braking control device for a vehicle includes a malfunction detector configured to detect a malfunction of a first stroke sensor or a second stroke sensor, a memory configured to store a first stroke and a second stroke, a stroke calculator for first calculation configured to calculate, from the first stroke and the second stroke, an average value for calculating a target deceleration before a malfunction is detected by the malfunction detector, a stroke calculator for second calculation configured to calculate, from the average value and the second stroke (first stroke), an additional value for calculating the target deceleration after the malfunction
(Continued)

is detected, and a target deceleration setting circuit configured to set the target deceleration from the average value or the additional value.

6 Claims, 4 Drawing Sheets

(51) Int. Cl.
*B60T 8/32* (2006.01)
*B60T 8/88* (2006.01)
*B60T 8/96* (2006.01)
*B60T 17/22* (2006.01)

(52) U.S. Cl.
CPC ......... *B60T 17/221* (2013.01); *B60T 2250/00* (2013.01); *B60T 2270/402* (2013.01); *B60T 2270/406* (2013.01)

(58) Field of Classification Search
CPC ........... B60T 2250/00; B60T 2270/402; B60T 2270/406; B60T 7/042; B60T 13/146; B60T 17/22; G06F 7/70
USPC .......................................................... 701/70
See application file for complete search history.

(56) References Cited

OTHER PUBLICATIONS

Written Opinion (PCT/ISA/237) dated Jun. 25, 2019, by the Japan Patent Office as the International Searching Authority for International Application No. PCT/JP2019/013786.

\* cited by examiner

BRAKING CONTROL DEVICE FOR VEHICLE

TECHNICAL FIELD

The present disclosure relates to a braking control device for a vehicle.

BACKGROUND ART

In the related art, a brake control device disclosed in PTL 1, for example, is known. The brake control device of the related art includes a first abnormality determination unit and a second abnormality determination unit. The first abnormality determination unit determines that an output of a first stroke sensor or a second stroke sensor is abnormal when a sum of a first output value and a second output value deviates from a predetermined range. In a case where it is determined by the first abnormality determination unit that the sum of the first output value and the second output value is within the predetermined range, when an absolute value of a difference between the first output value and the second output value is equal to or smaller than a predetermined threshold value and a master output value is smaller than a predetermined pressure value, the second abnormality determination unit determines that an output of the first stroke sensor or the second stroke sensor is abnormal.

CITATION LIST

Patent Literature

PTL 1: JP-A-2010-167970

SUMMARY OF INVENTION

Technical Problem

In the brake control device of the related art, based on the first output value (first physical quantity) of the first stroke sensor (first sensor) and the second output value (second physical quantity) of the second stroke sensor (second sensor), a target braking force (target deceleration) is calculated to control an operation of a hydraulic actuator when decelerating a vehicle, so that a braking force can be generated for a wheel. However, in the brake control device of the related art, for example, when calculating the target deceleration, based on an average output value of the first output value and the second output value, if one output value of the first output value and the second output value is abnormal, the target deceleration may be calculated based on only the other normal output value. In this case, the output value that is used for calculation of the target deceleration is offset, so that there is a high possibility that the target deceleration will change before and after the abnormality of the output value occurs. As a result, a brake feeling may be deteriorated upon braking.

The present disclosure has been made in view of the above situation. That is, an object of the present disclosure is to provide a braking control device for a vehicle capable of suppressing deterioration in brake feeling even when an abnormality occurs in a first sensor or a second sensor.

Solution to Problem

In order to achieve the above object, a braking control device for a vehicle includes a first sensor configured to detect a first physical quantity that indicates a vehicle state and is used so as to calculate a target deceleration of the vehicle; a second sensor configured to detect a second physical quantity that is the same kind of the first physical quantity or is related to the first physical quantity; a malfunction detector configured to detect a malfunction of the first sensor; a memory configured to store the first physical quantity detected by the first sensor and the second physical quantity detected by the second sensor; a first calculator configured to calculate, from the first physical quantity and the second physical quantity stored in the memory, a first calculated value for calculating the target deceleration before the malfunction is detected by the malfunction detector; a second calculator configured to calculate a second calculated value for calculating the target deceleration from the first calculated value calculated by the first calculator and the second physical quantity detected by the second sensor at or after the malfunction is detected by the malfunction detector; and a target deceleration setting circuit sets the target deceleration from the first calculated value calculated by the calculator while the malfunction is not detected by the malfunction detector, and the target deceleration setting circuit sets the target deceleration from the second calculated value calculated by the second calculator while the malfunction is detected by the malfunction detector.

Advantageous Effects of Invention

According to the above configuration, in a situation where the malfunction detector detects a malfunction in the first sensor, the second calculator can calculate the second calculated value at or after the malfunction is detected, from the second physical quantity detected by the second sensor in which the malfunction is not detected and the first calculated value calculated by the first calculator before the malfunction is detected. While the malfunction is not detected by the malfunction detector, the target deceleration setting circuit sets the target deceleration by using the first calculated value, and the target deceleration setting circuit sets the target deceleration by using the second calculated value while the malfunction is detected.

Thereby, the second calculator can calculate the second calculated value, considering the correlation between the second physical quantity detected by the second sensor and the first calculated value before a malfunction of the first sensor is detected by the malfunction detector. Therefore, the target deceleration setting circuit sets the target deceleration by using the first calculated value or the second calculated value, thereby suppressing a change in correlation of the target deceleration before and at or after the malfunction of the sensor is detected. As a result, it is possible to prevent deterioration in brake feeling before and at or after the malfunction of the sensor is detected.

DESCRIPTION OF EMBODIMENTS

Figure 1:
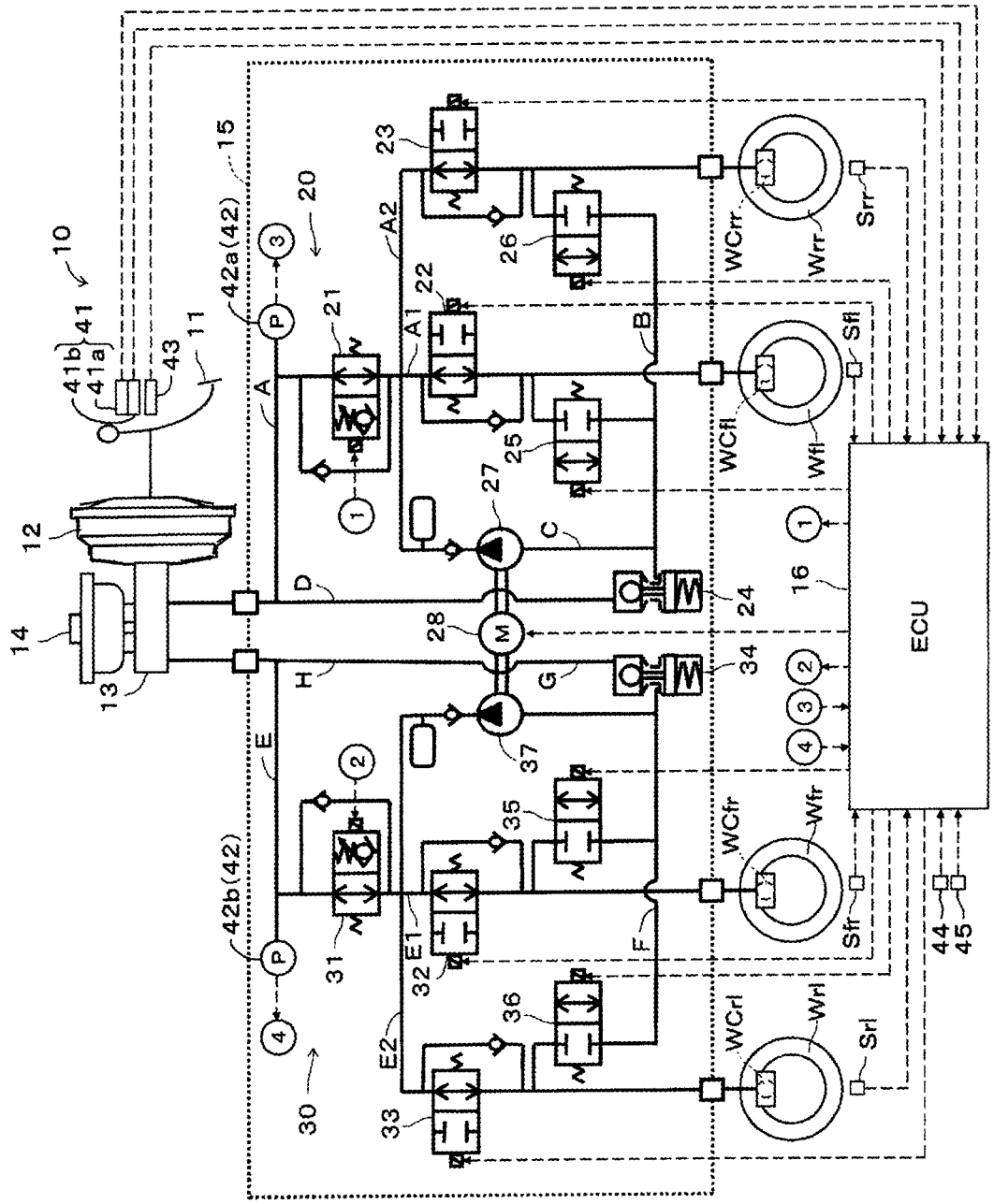
FIG. 1 is a schematic view depicting a configuration of a brake device in accordance with an embodiment of the present disclosure.

Hereinbelow, an embodiment of the present disclosure will be described with reference to the drawings. In the meantime, in the embodiment and modified embodiments to be described later, the same or equivalent parts are denoted with the same reference signs in the drawings. Also, the drawings used for descriptions are conceptual views, and shapes of respective parts may not be strictly exact.

As shown in FIG. 1, a braking control device 10 for a vehicle of the present embodiment is configured to boost a depression force corresponding to a driver's depression operation on a brake pedal 11 by a boosting device 12 and then to generate a brake fluid pressure corresponding to the boosted depression force in a master cylinder 13. The master cylinder 13 is connected to a reservoir tank 14 in which a brake fluid is reserved. The brake fluid pressure generated in the master cylinder 13 is transmitted to a wheel cylinder WCfl, a wheel cylinder WCrr, a wheel cylinder WCfr, and a wheel cylinder WCrl provided to each of brake mechanisms of a left front wheel Wfl, a right rear wheel Wrr, a right front wheel Wfr, and a left rear wheel Wrl, so that each of the brake mechanisms generates a braking force.

Also, the braking control device 10 for a vehicle is provided with a brake actuator 15 that is a hydraulic circuit between the master cylinder 13 and the wheel cylinder WCfl, wheel cylinder WCrr, wheel cylinder WCfr and wheel cylinder WCrl. The brake actuator 15 is configured to adjust the braking force that is generated by the braking control device 10 for a vehicle, and to perform a variety of controls including an anti-skid control.

In the brake actuator 15, a first pipe system 20 and a second pipe system 30 each of which is formed to communicate with each of a primary chamber and a secondary chamber of the master cylinder 13 are configured. The first pipe system 20 is configured to control a brake fluid pressure that is applied to the left front wheel Wfl and the right rear wheel Wrr, and the second pipe system 30 is configured to control a brake fluid pressure that is applied to the right front wheel Wfr and the left rear wheel Wrl. That is, the braking control device 10 for a vehicle has a so-called X-pipe arrangement.

A master cylinder pressure P that is the brake fluid pressure generated in the master cylinder 13 is transmitted to the wheel cylinder WCfl, the wheel cylinder WCrr, the wheel cylinder WCfr and the wheel cylinder WCrl via the first pipe system 20 and the second pipe system 30 of the brake actuator 15.

The first pipe system 20 is provided with a pipe conduit A for interconnecting the primary chamber of the master cylinder 13 and the wheel cylinder WCfl and wheel cylinder WCrr. The second pipe system 30 is provided with a pipe conduit E for interconnecting the secondary chamber of the master cylinder 13 and the wheel cylinder WCfr and wheel cylinder WCrl. Therefore, the master cylinder pressure P is transmitted to the wheel cylinder WCfl, the wheel cylinder WCrr, the wheel cylinder WCfr and the wheel cylinder WCrl through the pipe conduit A and the pipe conduit E.

Also, the pipe conduit A and the pipe conduit E have a differential pressure control valve 21 and a differential pressure control valve 31 that can be controlled to a communication state and a differential pressure state. Each of the differential pressure control valves 21 and 31 is configured so that a valve position is adjusted so as to be in a communication state when a driver operates the brake pedal 11. When a current is supplied to solenoid coils provided to the differential pressure control valves 21 and 31, the valve positions are adjusted so that the larger the current value is, the larger the differential pressure state is formed.

The differential pressure control valves 21 and 31 allow the brake fluid to flow from the wheel cylinder WCfl, the wheel cylinder WCrr, the wheel cylinder WCfr and the wheel cylinder WCrl to the master cylinder 13 only when the brake fluid pressures of the wheel cylinder WCfl, the wheel cylinder WCrr, the wheel cylinder WCfr and the wheel cylinder WCrl become higher than the master cylinder pressure P by a predetermined pressure or higher in a differential pressure state. Thereby, a state where the pressure is higher in the wheel cylinder WCfl, the wheel cylinder WCrr, the wheel cylinder WCfr and the wheel cylinder WCrl than in the master cylinder 13 by the predetermined pressure is always kept. In the meantime, although not shown, the wheel cylinders WCfl, WCrr, WCfr and WCrl may be each provided with a wheel cylinder pressure sensor configured to detect a wheel cylinder pressure that is the brake fluid pressure that acts on each of the wheel cylinders WCfl, WCrr, WCfr and WCrl.

As shown in FIG. 1, the pipe conduit A and the pipe conduit E are each branched into a pipe conduit A1 and a pipe conduit A2, and a pipe conduit E1 and a pipe conduit E2 on sides of the wheel cylinder WCfl, the wheel cylinder WCrr, the wheel cylinder WCfr and the wheel cylinder WCrl, which are located downstream of the differential pressure control valves 21 and 31. The pipe conduit A1 and the pipe conduit A2 are provided with a first pressure increasing control valve 22 and a first pressure increasing control valve 23 configured to control an increase in pressure of the brake fluid pressure into the wheel cylinder WCfl and the wheel cylinder WCrr. The pipe conduit E1 and the pipe conduit E2 are provided with a second pressure increasing control valve 32 and a second pressure increasing control valve 33 configured to control an increase in pressure of the brake fluid pressure into the wheel cylinder WCfr and the wheel cylinder WCrl.

The first pressure increasing control valves 22 and 23 and the second pressure increasing control valves 32 and 33 are each configured by a two-way electromagnetic valve of which a communication state or a cutoff state can be controlled. The first pressure increasing control valves 22 and 23 and the second pressure increasing control valves 32 and 33 are each a normally open electromagnetic valve that is controlled to a communication state in a non-energization state where a control current to a solenoid coil is regarded as zero, and is controlled to a cutoff state in an energization state where a control current is supplied to the solenoid coil.

A pressure adjusting reservoir 24 and a pressure adjusting reservoir 34 are respectively connected between the first pressure increasing control valves 22 and 23 and second pressure increasing control valves 32 and 33 and the wheel cylinder WCfl, wheel cylinder WCrr, wheel cylinder WCfr and wheel cylinder WCrl on the pipe conduit A and the pipe conduit E, via a pipe conduit B and a pipe conduit F, which are pressure reducing pipe conduits. On the pipe conduit B, a first pressure reducing control valve 25 and a first pressure reducing control valve 26 configured to control reduction in pressure of the brake fluid pressure into the wheel cylinder WCfl and the wheel cylinder WCrr are provided. On the pipe conduit F, a second pressure reducing control valve 35 and a second pressure reducing control valve 36 configured to control reduction in pressure of the brake fluid pressure into the wheel cylinder WCfr and the wheel cylinder WCrl are provided.

The first pressure reducing control valves 25 and 26 and the second pressure reducing control valves 35 and 36 are each configured by a two-way electromagnetic valve of which a communication state or a cutoff state can be controlled. The first pressure reducing control valves 25 and 26 and the second pressure reducing control valves 35 and 36 are each a normally closed electromagnetic valve that is controlled to a cutoff state in a non-energization state where a control current to a solenoid coil is zero, and is controlled to a communication state in an energization state where a control current is supplied to the solenoid coil.

A pipe conduit C and a pipe conduit G that are reflux flow pipe conduits are arranged between the pressure adjusting reservoir 24 and pressure adjusting reservoir 34 and the pipe conduit A and pipe conduit E that are main pipe conduits. The pipe conduit C and the pipe conduit G are provided with self-suction pumps 27 and 37 that are driven by a motor 28 configured to suck and discharge the brake fluid from the pressure adjusting reservoirs 24 and 34 toward the master cylinder 13 or the wheel cylinder WCfl, the wheel cylinder WCrr, the wheel cylinder WCfr and the wheel cylinder WCrl. The motor 28 is driven by controlling energization thereof by a drive circuit (not shown).

A pipe conduit D and a pipe conduit H that are auxiliary pipe conduits are provided between the pressure adjusting reservoirs 24 and 34 and the master cylinder 13. The pump 27 and the pump 37 are configured to suck the brake fluid from the master cylinder 13 through the pipe conduit D and the pipe conduit H and to discharge the brake fluid to the pipe conduit A and the pipe conduit E, thereby supplying the brake fluid (brake fluid pressure) toward the wheel cylinder WCfl, the wheel cylinder WCrr, the wheel cylinder WCfr and the wheel cylinder WCrl.

The diverse operations of the brake actuator 15 are controlled by an electronic control unit 16 (hereinbelow, simply referred to as "ECU 16"). The ECU 16 is electrically connected to the diverse actuators configuring the brake actuator 15, such as the differential pressure control valves 21 and 31, the first pressure increasing control valves 22 and 23, the second pressure increasing control valves 32 and 33, the first pressure reducing control valves 25 and 26, the second pressure reducing control valves 35 and 36, the motor 28, and the like.

Thereby, the ECU 16 is configured to output the control current to the differential pressure control valves 21 and 31, the first pressure increasing control valves 22 and 23, the second pressure increasing control valves 32 and 33, the first pressure reducing control valves 25 and 26, the second pressure reducing control valves 35 and 36, and the motor 28, which configure the brake actuator 15, thereby individually controlling the wheel cylinder pressures in the wheel cylinder WCfl, the wheel cylinder WCrr, the wheel cylinder WCfr and the wheel cylinder WCrl. Specifically, for example, the ECU 16 executes an anti-skid control of preventing a wheel from being locked by reducing, keeping and increasing the wheel cylinder pressure upon wheel slip during braking, and a sideslip prevention control of stabilizing a vehicle posture upon turning by automatically pressurizing a wheel cylinder pressure of a control target wheel to prevent a sideslip tendency (understeer tendency or oversteer tendency).

The ECU 16 includes a CPU configured to execute a variety of calculation processing, a ROM in which a variety of control programs are stored, a RAM that is used as a work area for storing data and executing a program, a non-volatile memory such as a backup RAM capable of keeping stored contents even during an engine is in a stop state, and an input/output interface. Also, the ECU 16 includes an A/D converter for converting analog signals input from diverse sensors into digital signals to acquire the digital signals, a timer for time measurement, and the like.

Also, as shown in FIG. 1, the ECU 16 is electrically connected to a stroke sensor 41, a master cylinder pressure sensor 42, a stop lamp switch 43, a front and rear acceleration sensor 44, and a yaw rate sensor 45 configured to output signals that are used for control. Also, the ECU 16 is electrically connected to a wheel speed sensor Sfl, a wheel speed sensor Srr, a wheel speed sensor Sfr and a wheel speed sensor Srl each of which is provided to each of the wheels Wfl, Wrr, Wfr and Wrl.

The stroke sensor 41 is configured to detect a stroke U (an amount of depression) of the brake pedal 11, as a physical quantity that indicates a vehicle state (braking state) and is used so as to calculate a target deceleration Gd of the vehicle, as described later. As shown in FIG. 1, the stroke sensor 41 includes a first stroke sensor 41a as a first sensor configured to detect a first stroke U1 as a first physical quantity and a second stroke sensor 41b as a second sensor configured to detect a second stroke U2 as a second physical quantity.

In the present embodiment, the first sensor is set as the first stroke sensor 41a, the second sensor is set as the second stroke sensor 41b, the first stroke sensor 41a is configured to detect the first stroke U1 as a first physical quantity, and the second stroke sensor 41b is configured to detect the second stroke U2 as a second physical quantity. However, the first sensor may be set as the second stroke sensor 41b, the second sensor may be set as the first stroke sensor 41a, the second stroke sensor 41b may be configured to detect the second stroke U2 as the first physical quantity, and the first stroke sensor 41a may be configured to detect the first stroke U1 as the second physical quantity.

The first stroke sensor 41a and the second stroke sensor 41b are each a non-contact Hall IC type of a magnetic sensor, for example, and are provided to a rotary shaft of the brake pedal 11. The first stroke sensor 41a and the second stroke sensor 41b are supplied with power from a power supply unit (not shown), and are configured to output the detected first stroke U1 and second stroke U2 (output voltages corresponding to strokes) to the ECU 16.

The master cylinder pressure sensor 42 is configured to detect the master cylinder pressure P as a physical quantity that indicates a vehicle state (braking state) and can be used so as to calculate the target deceleration Gd of the vehicle. As shown in FIG. 1, the master cylinder pressure sensor 42 includes a first master cylinder pressure sensor 42a provided on the pipe conduit A, as the first sensor configured to detect a first master cylinder pressure P1 as the first physical quantity, and a second master cylinder pressure sensor 42b provided on the pipe conduit E, as the second sensor configured to detect a second master cylinder pressure P2 as the second physical quantity. The first master cylinder pressure sensor 42a and the second master cylinder pressure sensor 42b are supplied with power from the power supply unit (not shown), and are configured to output the detected first master cylinder pressure P1 and second master cylinder pressure P2 (voltages corresponding to master cylinder pressures) to the ECU 16.

The stop lamp switch 43 is configured to detect whether the brake pedal 11 is depressed. The stop lamp switch 43 is used to control lighting of a brake lamp provided on a rear side of the vehicle. That is, when a driver depresses the brake pedal 11, the stop lamp switch 43 becomes ON, so that the brake lamp is turned on, and when the depression on the brake pedal 11 is released, the stop lamp switch 43 becomes OFF, so that the brake lamp is turned off. The stop lamp switch 43 is supplied with power from the power supply unit (not shown), and is configured to output an electric signal corresponding to an ON or OFF state to the ECU 16.

The front and rear acceleration sensor 44 is configured to detect an acceleration Gr (or deceleration Gr) generated in a front and rear direction of the vehicle. The front and rear acceleration sensor 44 is supplied with power from the power supply unit (not shown), and is configured to output an electric signal (for example, a voltage) corresponding to the detected acceleration Gr to the ECU 16. In the meantime, the acceleration Gr that is detected by the front and rear acceleration sensor 44 may be a physical quantity that indicates the vehicle state (braking state) and is used so as to calculate the target deceleration Gd of the vehicle. Therefore, the front and rear acceleration sensor 44 may also be redundantly configured by a first front and rear acceleration sensor as the first sensor configured to detect an acceleration (deceleration) as the first physical quantity and a second front and rear acceleration sensor as the second sensor configured to detect an acceleration (deceleration) as the second physical quantity.

The yaw rate sensor 45 is configured to detect a yaw rate Y that is generated in the vehicle. The yaw rate sensor 45 is supplied with power from the power supply unit (not shown), and is configured to output an electric signal (for example, a voltage) corresponding to the detected yaw rate Y to the ECU 16. In the meantime, the yaw rate Y that is detected by the yaw rate sensor 45 may be a physical quantity that indicates a vehicle state (turning state) and is used so as to calculate the target deceleration Gd of the vehicle. Therefore, the yaw rate sensor 45 may also be redundantly configured by a first yaw rate sensor as the first sensor configured to detect a yaw rate as the first physical quantity and a second yaw rate sensor as the second sensor configured to detect a yaw rate as the second physical quantity.

The wheel speed sensors Sfl, Srr, Sfr and Srl are configured to detect a wheel speed Vfl, a wheel speed Vrr, a wheel speed Vfr, and a wheel speed Vrl of the wheels Wfl, Wrr, Wfr and Wrl, respectively. The wheel speed sensors Sfl, Srr, Sfr and Srl are configured to output electric signal (for example, voltages) corresponding to the detected wheel speeds Vfl, Vrr, Vfr and Vrl to the ECU 16, respectively. Herein, the ECU 16 is configured to execute an anti-skid control and the like by calculating an estimated vehicle body speed, a slip ratio and the like from the wheel speeds Vfl, Vrr, Vfr and Vrl of the wheels Wfl, Wrr, Wfr and Wrl based on the electric signals input from the wheel speed sensors Sfl, Srr, Sfr and Srl.

In the braking control device 10 for a vehicle configured as described above, when the driver depresses the brake pedal 11, i.e., when an electric signal ON is output from the stop lamp switch 43, the ECU 16 calculates the target deceleration Gd of the vehicle from the stroke U of the brake pedal 11, and obtains target hydraulic pressures, which are target values of the wheel cylinder pressures of the wheel cylinders WCfl, WCrr, WCfr and WCrl, from the master cylinder pressure P so that a braking force implementing the calculated target deceleration Gd is generated at the wheels Wfl, Wrr, Wfr and Wrl. Then, the ECU 16 controls the first pressure increasing control valves 22 and 23, the second pressure increasing control valves 32 and 33, the first pressure reducing control valves 25 and 26, the second pressure reducing control valves 35 and 36, and the motor 28 to control the wheel cylinder pressures of the wheel cylinders WCfl, WCrr, WCfr and WCrl to reach the target hydraulic pressures.

In the braking control device 10 for a vehicle of the present embodiment, the stroke U (voltage) of the brake pedal 11 is used as the physical quantity (the first physical quantity and the second physical quantity that is the same kind of the first physical quantity) that is used so as to calculate the target deceleration Gd of the vehicle. The braking control device 10 for a vehicle is configured to detect whether a malfunction has occurred in any one of the first stroke sensor 41a configured to detect the first stroke U1 (voltage) and the second stroke sensor 41b configured to detect the second stroke U2 (voltage).

While a malfunction is not detected, the braking control device 10 for a vehicle adopts each of the first stroke U1 and the second stroke U2 that are detection results detected by the first stroke sensor 41a and the second stroke sensor 41b, and calculates an average value L of the first stroke U1 (voltage) and the second stroke U2 (voltage), for example, as the first calculated value. On the other hand, when a malfunction is detected in any one of the first stroke sensor 41a and the second stroke sensor 41b, the braking control device 10 for a vehicle adopts the first stroke U1 (voltage) or the second stroke U2 (voltage) that is a detection result detected by a sensor in which the malfunction is not detected. The braking control device 10 for a vehicle is configured to calculate a deviation σ, which is an offset between the first stroke U1 (voltage) or the second stroke U2 (voltage) calculated before the malfunction was detected and the average value L (average value Lp) that is the first calculated value, and sets, as the second calculated value, an additional value K obtained by adding the first stroke U1 (voltage) or the second stroke U2 (voltage) and the deviation σ, for example.

Figure 2:
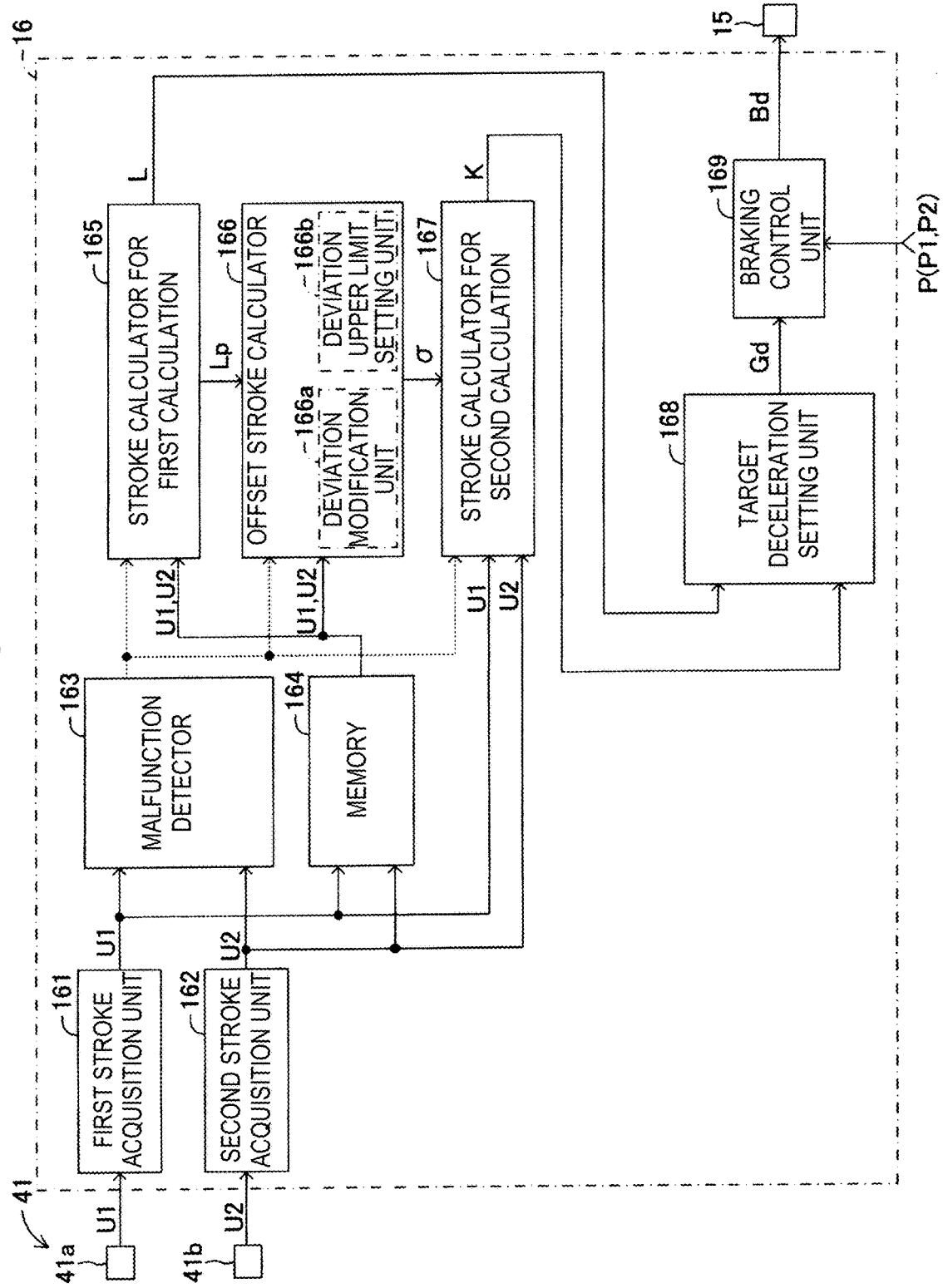
FIG. 2 is a functional block diagram depicting functions of an electronic control device (ECU) of FIG. 1.

Therefore, as shown in the functional block diagram of FIG. 2, the ECU 16 includes a first stroke acquisition unit 161, a second stroke acquisition unit 162, a malfunction detector 163, a memory 164, a stroke calculator 165 for first calculation as a first calculator, an offset stroke calculator 166 as a deviation calculator, a stroke calculator 167 for second calculation as a second calculator, a target deceleration setting unit 168, and a braking control unit 169. The first stroke acquisition unit 161 is also called as the first stroke acquisition circuit 161. The second stroke acquisition unit 162 is also called as the second stroke acquisition unit 162. The target deceleration setting unit 168 is also called as the target deceleration setting circuit 168.

The first stroke acquisition unit 161 is configured to acquire a first output voltage corresponding to the first stroke U1 detected as the first physical quantity, from the first stroke sensor 41a. The second stroke acquisition unit 162 is configured to acquire a second output voltage corresponding to the second stroke U2 detected as the second physical quantity, from the second stroke sensor 41b. The first stroke acquisition unit 161 and the second stroke acquisition unit 162 are configured to output the first stroke U1 (first output voltage) and the second stroke U2 (second output voltage) to the malfunction detector 163, the memory 164 and the stroke calculator 167 for second calculation.

Figure 3:
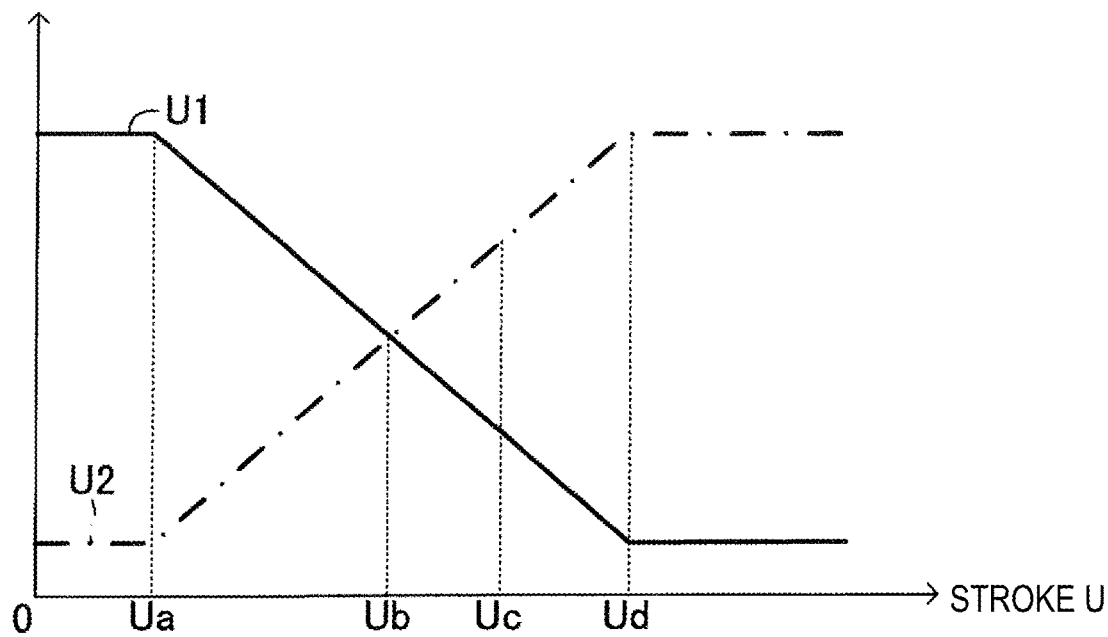
FIG. 3 depicts a relation between a stroke and an output voltage.

Herein, FIG. 3 depicts a relation between the stroke U of the brake pedal 11 and the output voltage of the stroke sensor 41, i.e., the first stroke sensor 41a and the second stroke sensor 41b. In FIG. 3, the solid line indicates the first output voltage corresponding to the first stroke U1 detected by the first stroke sensor 41a, and the dashed-dotted line indicates the second output voltage corresponding to the second stroke U2 detected by the second stroke sensor 41b. The second stroke sensor 41b outputs the second output voltage inverted with respect to the first output voltage of the first stroke sensor 41a. That is, the first output voltage of the first stroke sensor 41a decrease as the stroke U of the brake pedal 11 increases. On the other hand, the second output voltage of the second stroke sensor 41b increases as the stroke U of the brake pedal 11 increases.

Specifically, when the brake pedal 11 is not depressed, for example, the first output voltage of the first stroke sensor 41a is set to 4.6V, and the second output voltage of the second stroke sensor 41b is set to 0.4V. A region from a stroke Ua to a stroke Uc is a usual use range of the brake pedal 11. It is rare that the brake pedal 11 is depressed to the maximum amount Ud while the vehicle is traveling, and when the brake pedal 11 is depressed by about a half, a relatively large deceleration (braking force) is generated. That is, within a usual legal speed, a deceleration (braking force) enough to stop the vehicle is generated at a stroke Ub. In FIG. 3, an intersection of the first output voltage (solid line) and the second output voltage (dashed-dotted line) indicates a state where the brake pedal 11 is depressed in a relatively large amount.

Also, the stroke sensor 41 is configured by the first stroke sensor 41a and the second stroke sensor 41b and inverts the second output voltage with respect to the first output voltage, so that even when a noise temporarily occurs in a power supply, the noise can be cancelled. That is, even when the first output voltage and the second output voltage of the first stroke sensor 41a and the second stroke sensor 41b are affected by the noise, it is possible to cancel the noise by converting the first output voltage and the second output voltage into the strokes and using the average value.

The malfunction detector 163 is configured to detect a malfunction in any one of the first stroke sensor 41a and the second stroke sensor 41b. Specifically, the malfunction detector 163 is configured to determine whether a sum of the first output voltage (corresponding to the first stroke U1) input from the first stroke sensor 41a via the first stroke acquisition unit 161 and the second output voltage (corresponding to the second stroke U2) input from the second stroke sensor 41b via the second stroke acquisition unit 162 is within a predetermined range (for example, about 5V). When the sum of the first output voltage from the first stroke sensor 41a and the second output voltage from the second stroke sensor 41b deviates from the predetermined range, the malfunction detector 163 detects a malfunction of any one of the first stroke sensor 41a and the second stroke sensor 41b. In the meantime, when the first output voltage or the second output voltage changes out of the line diagram of FIG. 3, for example, it means that a malfunction has occurred in the first stroke sensor 41a or the second stroke sensor 41b. The malfunction detector 163 is configured to output information indicating whether the first stroke sensor 41a and the second stroke sensor 41b malfunction to the stroke calculator 165 for first calculation, the offset stroke calculator 166 and the stroke calculator 167 for second calculation, as shown with the broken line in FIG. 2.

The memory 164 is configured to continuously store the first output voltage (corresponding to the first stroke U1) detected via the first stroke acquisition unit 161 by the first stroke sensor 41a and the second output voltage (corresponding to the second stroke U2) detected via the second stroke acquisition unit 162 by the second stroke sensor 41b, as a first detection result and a second detection result, over time. The memory 164 is configured to output the stored detection results, i.e., the first stroke U1 and the second stroke U2 to the stroke calculator 165 for first calculation and the offset stroke calculator 166.

When the first stroke sensor 41a and the second stroke sensor 41b are normal without any malfunction, the stroke calculator 165 for first calculation as the first calculator calculates an average value L as the first calculated value by using the first stroke U1 as the first detection result and the second stroke U2 as the second detection result. Specifically, the stroke calculator 165 for first calculation is configured to acquire the first stroke U1 and the second stroke U2 sequentially stored in the memory 164 from the memory 164, and to calculate the average value L of the acquired first stroke U1 and second stroke U2. The stroke calculator 165 for first calculation is configured to output the calculated average value L to the target deceleration setting unit 168.

On the other hand, when a malfunction in any one of the first stroke sensor 41a and the second stroke sensor 41b is detected by the malfunction detector 163, the stroke calculator 165 for first calculation acquires, from the memory 164, the first stroke U1 and the second stroke U2 stored before the malfunction was detected, and calculates an average value Lp as the first calculated value before the malfunction was detected. Then, the stroke calculator 165 for first calculation is configured to output the average value Lp before the malfunction was detected to the offset stroke calculator 166.

The offset stroke calculator 166 as the deviation calculator is configured to calculate a deviation σ indicating a difference (offset) between the first stroke U1 or the second stroke U2, which is detected by the first stroke sensor 41a or the second stroke sensor 41b in which the malfunction was not detected, and the average value Lp that is the first calculated value before the malfunction was detected, after the malfunction was detected in any one of the first stroke sensor 41a and the second stroke sensor 41b by the malfunction detector 163. In this case, the stroke calculator 165 for first calculation is configured to acquire, from the memory 164, the first stroke U1 and the second stroke U2 stored before (immediately before) the malfunction was detected, to calculate the average value Lp by using the first stroke U1 and the second stroke U2 and to output the calculated average value to the offset stroke calculator 166.

Specifically, when the malfunction detector 163 detects a malfunction of the first stroke sensor 41a, the offset stroke calculator 166 calculates the deviation σ between the second stroke U2 detected by the second stroke sensor 41b and the average value Lp calculated by the stroke calculator 165 for first calculation. In the meantime, when the malfunction detector 163 detects a malfunction of the second stroke sensor 41b, the offset stroke calculator 166 calculates the deviation σ between the first stroke U1 detected by the first stroke sensor 41a and the average value Lp calculated by the stroke calculator 165 for first calculation. When the offset stroke calculator 166 calculates the deviation σ, the offset stroke calculator 166 outputs the calculated deviation σ to the stroke calculator 167 for second calculation.

When the malfunction detector 163 detects a malfunction in any one of the first stroke sensor 41a and the second stroke sensor 41b, the stroke calculator 167 for second calculation as the second calculator calculates an additional value K as the second calculated value by using the first stroke U1 as the first detection result detected by the first stroke sensor 41a in which the malfunction was not detected or the second stroke U2 as the second detection result detected by the second stroke sensor 41b in which the malfunction was not detected and the deviation σ calculated by the offset stroke calculator 166.

Specifically, when the malfunction of the first stroke sensor 41a is detected by the malfunction detector 163, the stroke calculator 167 for second calculation uses the second stroke U2 detected by the second stroke acquisition unit 162 without using the first stroke U1 detected by the first stroke acquisition unit 161. Then, the stroke calculator 167 for second calculation is configured to calculate the additional value K by adding the deviation σ calculated by the offset stroke calculator 166 to the second stroke U2. In the meantime, when the malfunction of the second stroke sensor 41b is detected by the malfunction detector 163, the stroke calculator 167 for second calculation uses the first stroke U1 detected by the first stroke acquisition unit 161 without using the second stroke U2 detected by the second stroke acquisition unit 162. Then, the stroke calculator 167 for second calculation is configured to calculate the additional value K by adding the deviation σ calculated by the offset stroke calculator 166 to the first stroke U1. When the stroke calculator 167 for second calculation calculates the additional value K, the stroke calculator 167 for second calculation outputs the calculated additional value K to the target deceleration setting unit 168.

When the malfunction detector 163 does not detect a malfunction, the target deceleration setting unit 168 sets the target deceleration Gd that is to be generated in the vehicle, from the average value L (by using the average value L) calculated by the stroke calculator 165 for first calculation, and when the malfunction detector 163 detects a malfunction, the target deceleration setting unit 168 sets the target deceleration Gd that is to be generated in the vehicle, from the additional value K (by using the additional value K) calculated by the stroke calculator 167 for second calculation. That is, the target deceleration setting unit 168 is configured to set the target deceleration Gd that changes to increase in a proportional function manner with an increase in the average value L or the additional value K, in other words, the stroke of the brake pedal 11, and to output the set target deceleration Gd to the braking control unit 169.

The braking control unit 169 is configured to calculate a target braking force Bd for implementing the target deceleration Gd set by the target deceleration setting unit 168. The braking control unit 169 is configured to acquire the master cylinder pressure P (the first master cylinder pressure P1 and the second master cylinder pressure P2) from the master cylinder pressure sensor 42 (the first master cylinder pressure sensor 42a and the second master cylinder pressure sensor 42b), and to control an operation of the brake actuator 15 so as to reach the calculated target braking force Bd. Herein, the target braking force Bd changes in a proportional function manner with an increase in the target deceleration Gd, for example.

Subsequently, operations of the ECU 16 configured as described above are described based on a timing chart shown in FIG. 4. In descriptions below, a case where a malfunction of the first stroke sensor 41a, which is the first sensor, of the first stroke sensor 41a and the second stroke sensor 41b is detected at time t1 by the malfunction detector 163 is exemplified.

A malfunction is not detected by the malfunction detector 163 until time t1 elapses. Therefore, since the first stroke sensor 41a and the second stroke sensor 41b are normal, the stroke calculator 165 for first calculation calculates the average value L (indicated by the thick broken line in FIG. 4) by using the first stroke U1 and the second stroke U2. Until time t1 at which the first stroke sensor 41a and the second stroke sensor 41b are normal, the average value L calculated using the stroke calculator 165 for first calculation is output to the target deceleration setting unit 168, and the target deceleration setting unit 168 calculates the target deceleration Gd (indicated by the long broken line in FIG. 4) by using the average value L. Therefore, in normal times, the braking control unit 169 calculates the target braking force Bd to control an operation of the brake actuator 15, based on the target deceleration Gd calculated using the average value L by the target deceleration setting unit 168.

Figure 4:
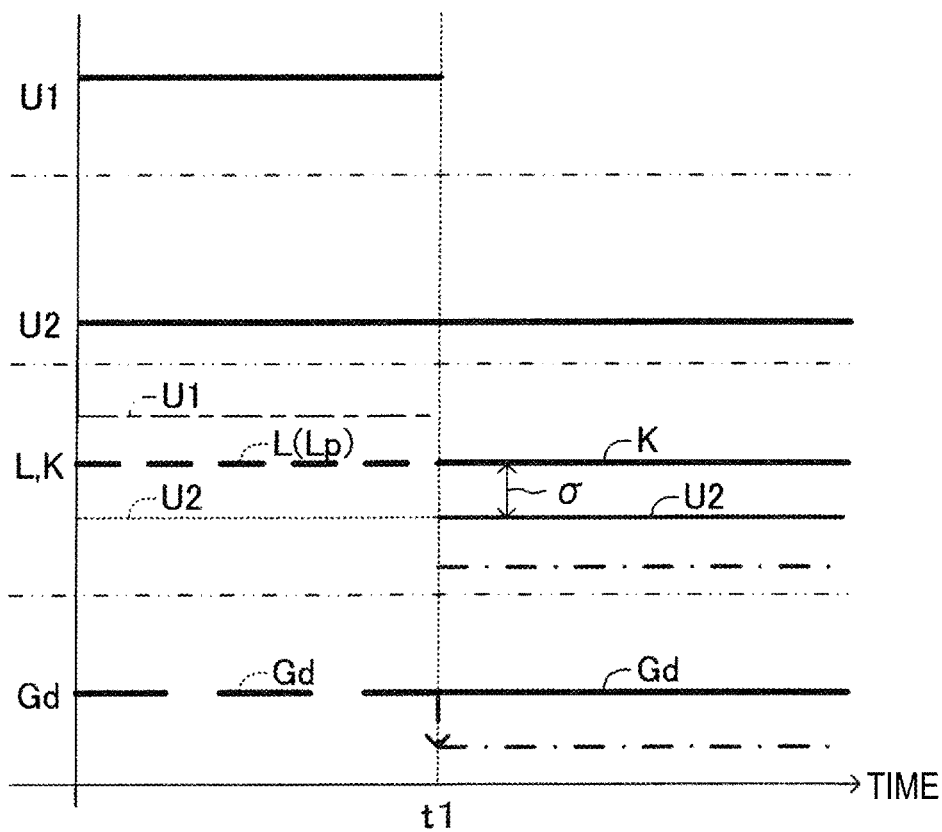
FIG. 4 is a timing chart for illustrating calculated of a target deceleration by the ECU of FIG. 2.

In a case where the malfunction detector 163 detects a malfunction of the first stroke sensor 41a at time t1, for example, if the stroke calculator 165 for first calculation calculates the average value L even after time t1, as in the normal times, the calculated average value L is significantly different from the value before time t1 (before the malfunction occurs), as indicated by the dashed-dotted line in FIG. 4. Thereby, the value of the target deceleration Gd set by the target deceleration setting unit 168 (and a value of the target braking force Bd calculated by the braking control unit 169) becomes also significantly different since time t1 at which the malfunction occurred, i.e., undergoes a so-called step change, as indicated by the dashed-dotted line in FIG. 4. As a result, the deceleration (braking force) that is actually generated in the vehicle is changed, so that the brake feeling is deteriorated.

Therefore, when the malfunction of the first stroke sensor 41a is detected at time t1 by the malfunction detector 163, the stroke calculator 167 for second calculation calculates the additional value K in cooperation with the offset stroke calculator 166. Specifically, after time t1, the stroke calculator 165 for first calculation calculates the average value Lp before time t1 by using the first stroke U1 and the second stroke U2 before time t1 (immediately before time t1) stored in the memory 164, and outputs the average value Lp to the offset stroke calculator 166.

The offset stroke calculator 166 calculates the deviation σ, which is a difference between the average value Lp acquired from the stroke calculator 165 for first calculation and the second stroke U2 detected by the second stroke sensor 41b as the second sensor, and outputs the calculated deviation σ to the stroke calculator 167 for second calculation. As shown in FIG. 4, the stroke calculator 167 for second calculation calculates the additional value K by adding the deviation σ acquired from the offset stroke calculator 166 and the second stroke U2 detected by the second stroke sensor 41b in which a malfunction is not detected. Then, the stroke calculator 167 for second calculation outputs the calculated additional value K to the target deceleration setting unit 168.

Thereby, after time t1 at which the malfunction occurred in the first stroke sensor 41a, the additional value K calculated by the stroke calculator 167 for second calculation is output to the target deceleration setting unit 168, and the target deceleration setting unit 168 calculates the target deceleration Gd by using the additional value K. Therefore, when a malfunction occurs, the braking control unit 169 controls the operation of the brake actuator 15 by calculating the target braking force Bd, based on the target deceleration Gd calculated using the additional value K by the target deceleration setting unit 168.

In the meantime, as shown in FIG. 4, the calculated deviation σ is a difference from the average value Lp before (immediately before) time t1 at which the malfunction of the first stroke sensor 41a was detected. For this reason, the average value L calculated by the stroke calculator 165 for first calculation before time t1 and the additional value K calculated by the stroke calculator 167 for second calculation after time t1 are substantially the same, as shown in FIG. 4. Therefore, the target deceleration Gd calculated using the average value L before time t1 by the target deceleration setting unit 168 and the target deceleration Gd set using the additional value K after time t1 become substantially the same value even at time t1 at which the malfunction occurred. As a result, the target braking force Bd that is calculated by the braking control unit 169 is also substantially the same even at time t1 at which the malfunction occurred. Therefore, it is possible to suppress a change in deceleration (braking force) that is actually generated in the vehicle, thereby suppressing the deterioration in brake feeling.

In the above descriptions, the case where the malfunction detector 163 detects the malfunction of the first stroke sensor 41a of the first stroke sensor 41a and the second stroke sensor 41b at time t1 has been exemplified. However, at time t1, when the malfunction detector 163 detects a malfunction of the second stroke sensor 41b of the first stroke sensor 41a and the second stroke sensor 41b, the deviation σ having a negative value is calculated by the offset stroke calculator 166, and the deviation σ having a negative value is added to the first stroke U1 acquired from the first stroke sensor 41a by the stroke calculator 167 for second calculation, so that the additional value K is calculated. The other parts are the same as the above descriptions.

Figure 5:
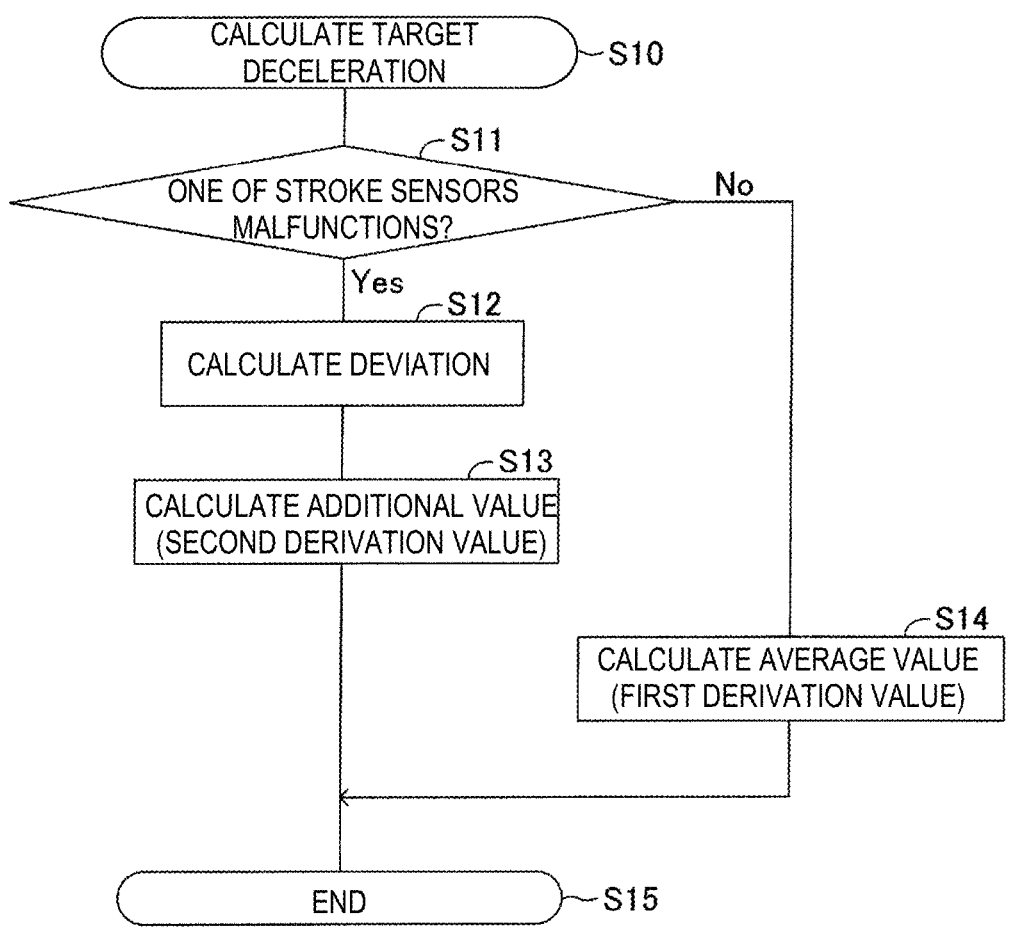
FIG. 5 is a flowchart of a calculated value calculation program for a target deceleration that is executed by the ECU of FIG. 2.

Herein, the above operations are implemented as the ECU 16 executes a calculated value calculation program for a target deceleration shown in FIG. 5. That is, the ECU 16 starts execution of the calculated value calculation program for a target deceleration in step S10. In subsequent step S11, the ECU 16 (the malfunction detector 163) determines whether a malfunction is detected in the stroke sensor 41, i.e., in any one of the first stroke sensor 41a and the second stroke sensor 41b. Specifically, when a malfunction is detected in the first stroke sensor 41a, which is any one of the first stroke sensor 41a and the second stroke sensor 41b, the ECU 16 (the malfunction detector 163) determines "Yes", and proceeds to step S12. On the other hand, while a malfunction is not detected in any one of the first stroke sensor 41a and the second stroke sensor 41b, the ECU 16 (the malfunction detector 163) determines "No", and proceeds to step S14.

In step S12, the ECU 16 (the offset stroke calculator 166 that is a deviation calculator) calculates, as an offset, the deviation σ that is a difference between the average value Lp before (immediately before) time t1 at which the malfunction was detected in the first stroke sensor 41a, i.e., the average value Lp in normal times and the second stroke U2 acquired from the second stroke sensor 41b in which a malfunction is not detected, and proceeds to step S13.

In step S13, the ECU 16 (the stroke calculator 167 for second calculation that is a second calculator) calculates the additional value K as the second calculated value by adding the deviation σ calculated in step S12 and the second stroke U2 acquired from the second stroke sensor 41b. On the other hand, when a malfunction of the second stroke sensor 41b is detected by the ECU 16 (the malfunction detector 163), the deviation σ having a negative value is calculated by the ECU (the offset stroke calculator 166). Therefore, the deviation σ having a negative value is added to the first stroke U1 acquired from the first stroke sensor 41a, so that the additional value K is calculated. Then, the ECU 16 proceeds to step S15 to end the execution of the calculated value calculation program for a target deceleration, and calculates the target deceleration Gd and the target braking force Bd, as described above, thereby controlling the operation of the brake actuator 15.

On the other hand, while a malfunction is not detected in any one of the first stroke sensor 41a and the second stroke sensor 41b and a determination "No" is thus made in step S11, the ECU 16 (the stroke calculator 165 for first calculation that is a first calculator) calculates the average value L as the first calculated value by using the first stroke U1 and the second stroke U2 acquired from the first stroke sensor 41a and the second stroke sensor 41b, in step S14. Then, the ECU 16 proceeds to step S15 to end the calculated value calculation program for a target deceleration, and calculates the target deceleration Gd and the target braking force Bd, as described above, thereby controlling the operation of the brake actuator 15.

As can be understood from the above descriptions, the braking control device 10 for a vehicle of the embodiment includes the first stroke sensor 41a as the first sensor configured to detect the first stroke U1 as the first physical quantity that indicates a vehicle state (for example, a braking state) and is used so as to calculate the target deceleration Gd of the vehicle; the second stroke sensor 41b as the second sensor configured to detect the second stroke U2 as the second physical quantity that is the same kind of the first stroke U1 or is related to the first stroke U1; the malfunction detector 163 configured to detect a malfunction of the first stroke sensor 41a as any one of the first stroke sensor 41a and the second stroke sensor 41b; the memory 164 configured to store the first stroke U1 (first output voltage) detected by the first stroke sensor 41a and the second stroke U2 (second output voltage) detected by the second stroke sensor 41b; the stroke calculator 165 for first calculation as the first calculator configured to calculate, from the first stroke U1 (first output voltage) and the second stroke U2 (second output voltage) stored in the memory 164, the average value L as the first calculated value for deriving the target deceleration Gd before time t1 at which a malfunction is detected by the malfunction detector 163; the stroke calculator 167 for second calculation as the second calculator configured to calculate, from the average value L calculated by the stroke calculator 165 for first calculation and the second stroke U2 (second output voltage) detected by the second stroke sensor 41b, in which a malfunction is not detected by the malfunction detector 163, of the first stroke sensor 41a and the second stroke sensor 41b, the additional value K as the second calculated value for calculating the target deceleration Gd after time t1 at which the malfunction is detected by the malfunction detector 163 (after the point in time); and the target deceleration setting unit 168 that, while a malfunction is not detected by the malfunction detector 163, sets the target deceleration Gd from the average value L calculated by the stroke calculator 165 for first calculation, and when a malfunction is detected by the malfunction detector 163, sets the target deceleration Gd from the additional value K calculated by the stroke calculator 167 for second calculation.

According to the above configuration, in a situation where the malfunction detector 163 detected a malfunction of the first stroke sensor 41a as anyone of the first stroke sensor 41a and the second stroke sensor 41b, the stroke calculator 167 for second calculation can calculate the additional value K after time t1 at which the malfunction was detected, from the second stroke U2 (second output voltage) from the second stroke sensor 41b as the sensor in which a malfunction is not detected and the average value L (average value Lp) calculated by the stroke calculator 165 for first calculation before time t1 at which the malfunction was detected. The target deceleration setting unit 168 sets the target deceleration Gd by using the average value L calculated by the stroke calculator 165 for first calculation, before time t1 at which the malfunction was detected, and sets the target deceleration Gd by using the additional value K calculated by the stroke calculator 167 for second calculation, after time t1 at which the malfunction was detected.

Thereby, before time t1 at which the malfunction was detected by the malfunction detector 163, the stroke calculator 167 for second calculation can calculate the additional value K, considering the correlation between the second stroke U2 (second output voltage) from the second stroke sensor 41*b* in which a malfunction is not detected and the average value L (average value Lp). Therefore, the target deceleration setting unit 168 can set the target deceleration Gd by using the average value L or the additional value K, thereby suppressing the change in correlation of the target deceleration Gd before and after time t1 at which the malfunction of the sensor, for example, the first stroke sensor 41*a* was detected by the malfunction detector 163. As a result, it is possible to suppress the deterioration in brake feeling before and after time t1 at which the malfunction of the sensor, for example, the first stroke sensor 41*a* was detected, thereby obtaining the favorable brake feeling.

In this case, the braking control device includes the offset stroke calculator 166 as the deviation calculator configured to calculate the deviation σ between the second stroke U2 (second output voltage) from the second stroke sensor 41*b*, in which a malfunction is not detected by the malfunction detector 163, of the first stroke sensor 41*a* and the second stroke sensor 41*b* and the average value Lp calculated by the stroke calculator 165 for first calculation before time t1 at which the malfunction was detected by the malfunction detector 163, after time t1 at which the malfunction was detected by the malfunction detector 163 (after the point in time), and the stroke calculator 167 for second calculation is configured to calculate the additional value K from the second stroke U2 (second output voltage) detected by the second stroke sensor 41*b*, in which a malfunction is not detected by the malfunction detector 163, of the first stroke sensor 41*a* and the second stroke sensor 41*b* and the deviation σ calculated by the offset stroke calculator 166.

According to the above configuration, by using the deviation σ calculated by the offset stroke calculator 166, the stroke calculator 167 for second calculation can calculate the additional value K, and the target deceleration setting unit 168 can set the target deceleration Gd. By using the deviation σ, the stroke calculator 167 for second calculation can calculate the additional value K, considering more appropriately the correlation between the second stroke U2 detected by the second stroke sensor 41*b*, in which a malfunction is not detected, and the average value Lp as the first calculated value before the malfunction was detected by the malfunction detector 163. Therefore, it is possible to prevent the change in correlation of the target deceleration Gd before and after time t1 at which the malfunction of the sensor was detected, so that it is possible to prevent the change in brake feeling before and after time t1 at which the malfunction of the sensor was detected, i.e., to obtain the favorable brake feeling.

First Modified Embodiment

In the above embodiment, the offset stroke calculator 166 as the deviation calculator is configured to calculate the deviation σ that is a difference between the average value Lp as the first calculated value before (immediately before) time t1 at which a malfunction of the first stroke sensor 41*a* was detected and the second stroke U2 acquired from the second stroke sensor 41*b*, for example. The stroke calculator 167 for second calculation as the second calculator is configured to calculate, as the second calculated value, the additional value K obtained by adding the deviation σ and the second stroke U2 acquired from the second stroke sensor 41*b*.

In this case, the offset stroke 166 may include a deviation modification unit 166*a* configured to modify a magnitude of the deviation σ, in accordance with a magnitude of the second stroke U2 acquired from the second stroke sensor 41*b* in which a malfunction is not detected, for example, as shown with the dashed-dotted line in FIG. 2. The deviation modification unit 166*a* is also called as the deviation modification circuit 166*a*. Specifically, the deviation modification unit 166*a* is configured to decrease the deviation σ, after time t1, as the second stroke U2 (hereinbelow, referred to as "second stroke U2 after malfunction") acquired from the second stroke sensor 41*b* in which a malfunction is not detected, for example, becomes smaller than the second stroke U2 (hereinbelow, referred to as "second stroke U2 before malfunction") acquired from the second stroke sensor 41*b* before time t1.

Thereby, a magnitude of the deviation σ is appropriately modified when a magnitude of the second stroke U2 after malfunction becomes smaller than a magnitude of the second stroke U2 before malfunction. Therefore, the additional value K that is the second calculated value calculated by the stroke calculator 167 for second calculation becomes a value corresponding to the second stroke U2 after malfunction, i.e., a driver's depression operation on the brake pedal 11, so that the driver can perceive the favorable brake feeling.

Second Modified Embodiment

In the above embodiment, the stroke calculator 167 for second calculation as the second calculator is configured to calculate, as the second calculated value, the additional value K obtained by adding the deviation σ and the second stroke U2 acquired from the second stroke sensor 41*b* in which a malfunction is not detected at time t1. In this case, when the second stroke U2 (second output voltage) acquired from the second stroke sensor 41*b* in which a malfunction is not detected is varied, for example, increased or decreased due to noises from the power supply, vibrations of the brake pedal 11, and the like, the additional value K is also varied, and the target deceleration Gd and the target braking force Bd may also be varied.

Therefore, the offset stroke calculator 166 can include a deviation upper limit setting unit 166*b* configured to set an upper limit of the deviation σ to be calculated, as shown with the dashed-dotted line in FIG. 2. The deviation upper limit setting unit 166*b* is also called as the deviation upper limit setting circuit 166*b*. Specifically, the deviation upper limit setting unit 166*b* is configured to set an upper limit, which is determined in accordance with a variation width of the second stroke U2 (second output voltage), for example, with respect to an absolute value of the deviation σ or a preset upper limit. Thereby, for example, even when the second stroke U2 (second output voltage) is varied, the variation in the additional value K is suppressed due to the set upper limit of the deviation σ. As a result, the variations in the target deceleration Gd and the target braking force Bd can be suppressed, so that the driver can perceive the favorable brake feeling.

When implementing the present disclosure, the present disclosure is not limited to the above embodiment and the respective modified embodiments, and a variety of changes can be made without departing from the object of the present disclosure.

For example, in the above embodiment, the malfunction detector 163 is configured to detect a malfunction in the stroke sensor 41, i.e., a malfunction in any one of the first stroke sensor 41a as the first sensor and the second stroke sensor 41b as the second sensor. As described above, the master cylinder pressure P that is the physical quantity detected by the master cylinder pressure sensor 42 has the correlation with the stroke U, and is a physical quantity that indicates a vehicle state (braking state) and is used so as to calculate the target deceleration Gd of the vehicle. Therefore, the malfunction detector 163 may detect a malfunction in the master cylinder pressure sensor 42, i.e., a malfunction in any one (first sensor) of the first master cylinder pressure sensor 42a as the first sensor and the second master cylinder pressure sensor 42b as the second sensor, and calculate the additional value K as the second calculated value by using the sensor (second sensor) in which a malfunction is not detected, and the deviation σ, in a similar manner to the above embodiment and the modified embodiments.

Also, in this case, both the stroke sensor 41 and the master cylinder pressure sensor 42 can detect the physical quantity that indicates a vehicle state (braking state) and is used so as to calculate the target deceleration Gd of the vehicle. Therefore, the malfunction detector 163 can also be configured to detect a malfunction in any one of the first stroke sensor 41a and the second master cylinder pressure sensor 42b (or, the second stroke sensor 41b and the first master cylinder pressure sensor 42a), for example. In this case, the second output voltage of the second master cylinder pressure sensor 42b is inverted with respect to the first output voltage of the first stroke sensor 41a (or, the first output voltage of the first master cylinder pressure sensor 42a is inverted with respect to the second output voltage of the second stroke sensor 41b), so that the malfunction detector 163 can detect a malfunction.

Also, in this case, the stroke calculator 165 for first calculation can calculate the average value L as the first calculated value, from the first output voltage corresponding to the first stroke U1 acquired from the first stroke sensor 41a and the second output voltage corresponding to the second master cylinder pressure P2 acquired from the second master cylinder pressure sensor 42b, for example, and the stroke calculator 167 for second calculation can calculate the additional value K as the second calculated value by adding the deviation σ to the second output voltage corresponding to the second master cylinder pressure P2, for example. Therefore, also in this case, it is possible to expect the similar effects to the above embodiment and the respective modified embodiments.

Also, in the above embodiment and the respective modified embodiments, the braking control unit 169 is configured to operate the brake actuator 15, and to control the wheel cylinder pressures of the wheel cylinders WCfl, WCrr, WCfr and WCrl, in accordance with the calculated target braking force Bd, thereby generating the frictional braking force. Instead of this configuration, the braking control unit 169 may be configured to control an operation of a generator motor configured to convert kinetic energy into electric energy so as to implement the target deceleration Gd calculated by the target deceleration setting unit 168, thereby controlling the vehicle by regenerative braking, for example.

Also, in the above embodiment and the respective modified embodiments, the offset stroke calculator 166 as the deviation calculator is configured to calculate the deviation σ, and the stroke calculator 167 for second calculation as the second calculator is configured to calculate the additional value K as the second calculated value by adding the deviation σ to the second stroke U2 acquired from the second sensor in which a malfunction is not detected, for example, the second stroke sensor 41b.

However, if the average value Lp as the first calculated value calculated by the stroke calculator 165 for first calculation as the first calculator before time t1 is equal to or greater than a predetermined value during a predetermined period before time t1 at which the additional value K is calculated, the stroke calculator 167 for second calculation can calculate the additional value K without adding the deviation σ. In other words, the stroke calculator 167 can calculate the additional value K by setting the deviation σ to zero. In this case, the additional value K is the same as the second stroke U2. According to this configuration, for example, If the average value Lp is equal to or greater than the predetermined value and the deviation σ becomes large during the predetermined period before time t1, the stroke calculator 167 for second calculation does not calculate an excessive additional value K. As a result, it is possible to prevent the target deceleration Gd and the target braking force Bd from being excessive so that the driver can perceive the favorable brake feeling.

The invention claimed is:

1. A braking control device for a vehicle comprising:
a first sensor configured to detect a first detected value of a first physical quantity that indicates a vehicle state and is used so as to calculate a target deceleration of the vehicle;
a second sensor configured to detect a second detected value of the first physical quantity or of a second physical quantity that is related to the first physical quantity;
a malfunction detector configured to detect a malfunction of the first sensor;
a memory configured to store the first detected value detected by the first sensor and the second detected value detected by the second sensor;
a first calculator configured to calculate a first calculated value from the first detected value and the second detected value stored in the memory, the first calculated value is for calculating the target deceleration before a malfunction is detected by the malfunction detector;
a second calculator configured to calculate a second calculated value from the first calculated value calculated by the first calculator and the second detected value detected by the second sensor, the second calculated value is for calculating the target deceleration at or after the malfunction is detected by the malfunction detector; and
a target deceleration setting circuit sets the target deceleration from the first calculated value calculated by the first calculator while the malfunction is not detected by the malfunction detector, and the target deceleration setting circuit sets the target deceleration from the second calculated value calculated by the second calculator while the malfunction is detected by the malfunction detector.

2. The braking control device for a vehicle according to claim 1, further comprising a deviation calculator configured to calculate a deviation from the second detected value detected by the second sensor at or after the malfunction is detected by the malfunction detector and the first calculated value that calculated by the first calculator before the malfunction is detected, wherein the second calculator is configured to calculate the second calculated value from the second detected value detected by the second sensor and the deviation calculated by the deviation calculator.

3. The braking control device for a vehicle according to claim 1, wherein the second calculator calculates the second calculated value from the second detected value detected by the second sensor if the first calculated value calculated by the first calculator before the malfunction is detected by the malfunction detector is equal to or greater than a predetermined value during a predetermined period of time before the second calculated value is calculated.

4. The braking control device for a vehicle according to claim 2, wherein the deviation calculator comprises a deviation modification circuit configured to decrease the deviation as the second detected value detected by the second sensor decreases at or after the malfunction is detected by the malfunction detector.

5. The braking control device for a vehicle according to claim 2, wherein the deviation calculator comprises a deviation upper limit setting circuit configured to set an upper limit of the deviation that is related to the second detected value detected by the second sensor at or after the malfunction is detected by the malfunction detector.

6. The braking control device for a vehicle according to claim 2, wherein the second calculator calculates the second calculated value from the second detected value detected by the second sensor if the first calculated value calculated by the first calculator before the malfunction is detected by the malfunction detector is equal to or greater than a predetermined value during a predetermined period of time before the second calculated value is calculated.

* * * * *